United States Patent [19]

Pavlik et al.

[11] 4,362,782

[45] Dec. 7, 1982

[54] LOW TEMPERATURE CURE INTERLAMINAR COATING

[75] Inventors: Norman M. Pavlik, Plum Boro; John Sefko, Monroeville, both of Pa.

[73] Assignee: Westinghouse Electric Corp., Pittsburgh, Pa.

[21] Appl. No.: 190,693

[22] Filed: Sep. 25, 1980

[51] Int. Cl.[3] ........................ B32B 15/04; B32B 13/06; C08K 3/10

[52] U.S. Cl. .................................... 428/336; 428/469; 106/286.1; 106/286.2; 106/286.6

[58] Field of Search ............................... 428/336, 469; 427/126.1; 106/286.1, 286.2, 286.6

[56] References Cited

U.S. PATENT DOCUMENTS

| | | | |
|---|---|---|---|
| 3,150,015 | 9/1964 | Boyer et al. | 106/286.1 |
| 3,658,587 | 4/1972 | Miller, Jr. | 106/286.6 |
| 4,037,019 | 7/1977 | Steger | 428/469 |

FOREIGN PATENT DOCUMENTS

| | | | |
|---|---|---|---|
| 579788 | 7/1959 | Canada | 106/286.6 |
| 607372 | 10/1960 | Canada | 106/286.6 |

*Primary Examiner*—Allan Lieberman
*Attorney, Agent, or Firm*—R. A. Stoltz

[57] ABSTRACT

A magnetically insulated article is described, together with the composition and method of applying the same which is characterized by a curing temperature within the range between about 220° F. and about 350° F.

3 Claims, No Drawings

LOW TEMPERATURE CURE INTERLAMINAR COATING

BACKGROUND OF THE INVENTION

This invention relates to magnetically insulating materials. These materials are applied to rotating apparatus and when cured at relatively low curing temperatures are effective for reducing eddy current losses relative to adjacent laminations.

Heretofore, one of the widely used magnetically insulating compositions applied to laminations which were later stacked for improved electrical efficiency involved the use of an aluminum or magnesium ortho-phosphate coating which was characterized by a curing temperature in the neighborhood of about 600° F. to 800° F. As cured, these laminations exhibited good surface resistance as measured by the ASTM Franklin test (2 $\Omega cm^2$/lam to >640 $\Omega cm^2$/lam) so that the coating won industry-wide acceptance for laminations destined for use in electrical apparatus.

Recently, the awakened consciousness of energy conservation has dictated that ways must be found to either improve the efficiency of rotating apparatus or to conserve energy in the manufacture of such apparatus. In order to achieve this latter goal it is necessary to lower the curing temperature significantly without adversely affecting the magnetic insulation quality of the coating. The lower curing temperatures have the added benefit of minimizing thermal distortions of the underlying laminations and thus will be stressed less thereby resulting in improved efficiencies when finally assembled into such apparatus.

SUMMARY OF THE INVENTION

The present invention relates to a coating composition for use on electrical steel compositions suitable for use in electromagnetic apparatus. The composition is essentially a zinc-nickel-phosphate composition to which a wetting agent and a material such as talc is added. This composition is formed into a water slurry, roller coated onto the steel such that the coating has a thickness of at least 0.05 mil/side to provide an insulation of at least 2 $\Omega cm^2$/lamination or 0.15 mil/side to provide an insulation of at least 640 $\Omega cm^2$/lam in the cured state. The coating is applied and adjusted so that there is no free acid on the steel surface.

Next the coating is cured by heating the same until the underlying steel attains a temperature of between about 220° F. and about 350° F. for a time sufficient to reactively cure the coating onto the steel. As cured, the laminations will exhibit a space factor greater than 95% and in the ASTM A-717 Franklin test a current between about 0.01 and about 0.8 amps.

DESCRIPTION OF THE PREFERRED EMBODIMENT

The present invention more specifically relates to a coating that is applied to steel either in strip or laminated form which is especially suitable for use in rotating apparatus. Such steel is characterized by having a random orientation as opposed to that steel which is usually utilized in the formation of transformer cores in which the steel has a preferred orientation usually referred to in terms of Miller indices by the indication (110) [001].

Since rotating apparatus usually employs a steel in which the grains are fairly randomly oriented, such steels have been known in the industry by the designations, for example, M36 and M47, which are classifications which are well known and are governed by the thickness, watt loss and other magnetic considerations. It is to this steel that the coating of the present invention is applied for the avowed purpose of reducing eddy current losses from lamination to lamination when these materials are utilized in stack configuration.

The present invention is also useful in providing a magnetically insulating coating on steels or substrates having a preferred orientation even though these steels or substrates are subject to different processing. In this regard, it has been found that heating the substrate to the steam releasing temperature of approximately 800° C. results in no greater degradation of properties than the prior art aluminum ortho-phosphate coatings and other coatings of that nature. The coating itself may be viewed as a zinc-nickel-phosphate coating and it is characterized by exhibiting good interlaminar resistance and more importantly the coating can be cured at a relatively low temperature, for example, a temperature of about 220° F. as opposed to the high temperatures which were required for the prior art aluminum or magnesium ortho-phosphate coatings, namely a temperature in the neighborhood of 645° F. The curing temperatures which are referred to in both the specification and in the claims are the temperatures to which the underlying substrate must be heated for curing the coating.

The coating essentially consists of from about 2% to about 6% by weight of zinc, from about 0.1% to about 1% by weight of nickel, from about 4% to about 8% of phosphorus and the balance essentially water. To this coating is also added from about 0.1% to about 1% of a wetting agent, for example, that commercial product known as Victowet #12 has given outstanding results. Also, there is added from about 5% to about 15% of an interlaminar resistance improving agent, magnesium silicate; talc may be utilized since it contains magnesium silicate as its major component. Furthermore to this is added from about 3% to about 15% by weight of an agent which improves the smoothness of the applied coating. This agent is selected from the group consisting of boric acid and aluminum nitrate, the balance essentially comprising water.

A typical formulation for the underlying zinc-nickel-phosphate involves about 39.2 grams per liter of zinc, about 6.0 grams per liter of nickel, about 75.6 grams per liter of phosphorus and 1166 grams per liter of water. Translated into percentages by weight these are equivalent to 3.05% by weight of zinc, 0.46% by weight of nickel, 5.9% by weight of phosphorus, and 90.6% by weight of water.

This solution may be formed by dissolving the requisite amount of zinc oxide into ortho-phosphoric acid to give a solution essentially consisting of zinc phosphate. Thereafter there is separately dissolved nickel metal or nickel oxide into boiling phosphoric acid, thereby giving a solution of nickel phosphate. Following this, the nickel phosphate is added to the required amount of water and thereafter the zinc phosphate is added to the nickel phosphate and water solution giving a solution of zinc-nickel-phosphate. This solution when made to the specific percentages as above set forth has a density of about 1.29 grams per cubic centimeter and a solids content of about 27.5%. Thereafter to assure a uniform coating coverage, the wetting agent such as Victowet

#12 is added, the same being present in the amount of from about 0.1% to about 1% by volume of the finished solution. Thereafter magnesium silicate usually in the form of talc is added in an amount of between about 5% and about 15% by weight of the finished solution and the magnesium silicate is effective for improving the interlaminar resistance of the coatings. Boric acid and/or aluminum nitrate additions in the amount of between 3% and about 15% by weight of the finished solution are also added to produce a smoother, more uniform surface.

This slurry as thoroughly mixed is then applied by roller application techniques utilizing either grooved rubber or felt applicator rolls. The resulting coating is similar to magnesium or aluminum ortho-phosphate coated steel except for the curing temperature. These similarities include (a) both are inorganic, (b) both are phosphate based, (c) the coating of this invention is equivalent to and provides better insulation values for a given thickness compared to the prior art coatings, (d) both have good high temperature properties, (e) both are corrosion resistant, (f) both have about the same coefficient of friction, and (g) both are compatible with epoxy resin. It has been found that when this solution is applied to the surface of an underlying steel substrate and thereafter the steel substrate is heated to a temperature between about 220° F. and about 350° F. the applied coating cures into a unitary mass with the substrate thereby imparting to the substrate a good interlaminar resistance with improved eddy current losses when the individual laminations are stacked for use in electromagnetic apparatus.

It has been found that while the foregoing is illustrative of the manner in making a zinc-nickel-phosphate coating, other various ratios of the components can be utilized, it being noted that good results are obtained where the mixture contains between about 20% and about 35% by weight of solids. This coating mixture is applied to the surfaces of the substrate and provides a density after curing of between about 1 and about 1.5 grams per cubic centimeter. As cured it has been found that the coating provides at least a 2 $\Omega cm^2$/lam and as much as 640 $\Omega cm^2$/lam value in the ASTM A-717 Franklin test.

In order to more clearly demonstrate the results of the present invention, reference is directed to Table I.

TABLE I

| Solution By Volume | Interlaminar Resistance* $\Omega cm^2$/Lamination | Lamination Space Factor |
|---|---|---|
| (A) 1 part Zn—Ni—Phos | 15 | 98.5% |
| 1 part $H_2O$ | | |
| 1% by volume | | |
| wetting agent | | |
| (B) Same as (A) with 10% magnesium silicate (talc) | 315 | 98.9% |
| (C) Same as (B) with 5% boric acid | 300 | 98.7% |

*ASTM Franklin test A-717

It has been found that the coating thickness should be at least about 0.05 mil per side and good results have been obtained where the coating thickness is about 0.15 mils per side so as to give at least 640 $\Omega cm^2$/lam value in the Franklin test. Moreover, it has been further found that there should be no free acid on the surface of the steel as the steel is coated with the solution as outlined hereinbefore. This can be conveniently checked by utilizing moist litmus paper to determine the presence or absence of free acid in the cured coating.

To further illustrate the benefits of the present invention, 60,000 lbs. of hydrogenerator punchings having a thickness of about 0.050 inches were coated with a coating having a composition within the limits set forth hereinbefore. These 60,000 lbs. of punchings when tested showed a space factor of 98.2% and an interlaminar insulation as measured by the ASTM A-717 Franklin test of 0.41 amps and 9.3 $\Omega cm^2$ per lamination. Thus it can be readily seen that the present invention is effective for producing outstanding interlamination resistance but more importantly has a sufficiently low curing temperature that substantial energy savings can be affected in producing the steel of the present invention which is suitable for use in electromagnetic apparatus.

We claim:

1. An article of manufacture comprising a substrate steel suitable for use in a magnetic circuit and an at least 0.05 mil coating on said substrate, the coating consisting essentially of the reaction products of a composition containing by weight 2% to 6% zinc, from about 0.1% to about 1% nickel, from about 4% to about 8% phosphorus, from about 0.1% to about 1% of a wetting agent, and from about 5% to about 15% of magnesium silicate as an interlaminar resistance improving agent, from about 3% to about 10% of an agent for improving the smoothness of the coating selected from the group consisting of boric acid and aluminum nitrate, and the balance essentially water.

2. The article of claim 1 in which the coating has a thickness between 0.05 and about 0.15 mils per side.

3. The article of claim 1 wherein the magnesium silicate is in the form of talc.

* * * * *